United States Patent
Natarajan et al.

(10) Patent No.: US 8,509,788 B2
(45) Date of Patent: Aug. 13, 2013

(54) DYNAMIC SHARING OF WIRELESS RESOURCES AMONG DIFFERENT COMMUNICATION NETWORKS

(75) Inventors: Kadathur S. Natarajan, Wilmette, IL (US); Daniel J. Coombes, Glen Ellyn, IL (US); William A Payne, III, Glen Ellyn, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1012 days.

(21) Appl. No.: 11/683,719

(22) Filed: Mar. 8, 2007

(65) Prior Publication Data

US 2008/0219213 A1 Sep. 11, 2008

(51) Int. Cl.
*H04W 40/00* (2009.01)
*H04W 72/00* (2009.01)
*H04W 74/00* (2009.01)
*H04B 7/00* (2006.01)

(52) U.S. Cl.
USPC ........ 455/448; 455/447; 455/450; 455/452.1; 455/453; 455/516; 455/519

(58) Field of Classification Search
USPC .............. 370/445; 455/447, 448, 450, 452.1, 455/453, 455, 516, 519
See application file for complete search history.

(56) References Cited

U.S. PATENT DOCUMENTS

| | | | | |
|---|---|---|---|---|
| 5,862,487 A | * | 1/1999 | Fujii et al. | 455/454 |
| 6,148,003 A | * | 11/2000 | Van Dort | 370/462 |
| 2002/0136187 A1 | * | 9/2002 | Aoyama et al. | 370/342 |
| 2003/0014488 A1 | * | 1/2003 | Dalal et al. | 709/204 |
| 2003/0153339 A1 | * | 8/2003 | Crockett et al. | 455/518 |
| 2003/0181213 A1 | * | 9/2003 | Sugar et al. | 455/454 |
| 2004/0024879 A1 | * | 2/2004 | Dingman et al. | 709/227 |
| 2004/0032843 A1 | * | 2/2004 | Schaefer et al. | 370/338 |
| 2004/0176122 A1 | * | 9/2004 | Godfrey | 455/509 |
| 2005/0254510 A1 | * | 11/2005 | Oja et al. | 370/431 |
| 2006/0148482 A1 | | 7/2006 | Mangold | |
| 2007/0213069 A1 | * | 9/2007 | Ji et al. | 455/450 |

(Continued)

FOREIGN PATENT DOCUMENTS

WO 03081848 A1 10/2003

OTHER PUBLICATIONS

Akyildiz, Ian F. et al.: "NeXt generation/dynamic spectrum access/cognitive radio wireless networks: A survey", Computer Networks, Elsevier Science Publishers B.V., Amsterdam, NL, vol. 50, No. 13, Sep. 15, 2006, pp. 2127-2159.

(Continued)

*Primary Examiner* — Vladimir Magloire
*Assistant Examiner* — Edd Rianne Plata (57) ABSTRACT

Various embodiments are described to enable multiple, independent communication networks to share in an autonomous and dynamic manner unlicensed wireless resources. Generally, this involves determining that a first network node (122) is using at least a portion of a wireless resource to provide network service to at least one remote unit (102). A second network node (123), under the control of a different network operator than the first node and desiring to use the wireless resource, sends the first network node, a request to relinquish use of at least a portion of the wireless resource. The second network node sends this request wirelessly, perhaps using the wireless resource itself. If the first network node grants the request, the second node may then begin using at least a portion of the relinquished resource to provide network service.

20 Claims, 6 Drawing Sheets

(56) References Cited

U.S. PATENT DOCUMENTS

2007/0287464 A1* 12/2007 Hamamoto et al. .......... 455/447
2008/0089279 A1* 4/2008 Hu et al. ...................... 370/329
2008/0268858 A1* 10/2008 Wu et al. ...................... 455/448

OTHER PUBLICATIONS

Lehr, William et al.: "Managing Shared Access to a Spectrum Commons", New Frontiers in Dynamic Spectrum Access Networks, 2005, Dyspan 2005, 2005, First IEEE International Symposium on Baltimore, Md., USA Nov. 8-11, 2005, Piscataway, NJ, USA IEEE, Nov. 8, 2005, pp. 420-444.

Pereirasamy, M.K. et al.: "Dynamic Inter-Operator Spectrum Sharing for UMTS FDD with Displaced Cellular Networks", Wireless Communications and Networking Conference, 2005 IEEE New Orleans, LA, USA Mar. 13-17, 2005, Piscataway, NJ, USA, IEEE, vol. 3, Mar. 13, 2005, pp. 1720-1725.

* cited by examiner

DYNAMIC SHARING OF WIRELESS RESOURCES AMONG DIFFERENT COMMUNICATION NETWORKS

FIELD OF THE INVENTION

The present invention relates generally to communication systems and, in particular, to sharing wireless resources among different communication networks dynamically.

BACKGROUND OF THE INVENTION

In the United States and elsewhere, WiMAX (Worldwide Interoperability for Microwave Access)-based systems are being designed and developed for operation in licensed bands, such as 2.3 GHz, 2.5 GHz, 3.3 GHz, 3.5 GHz etc. However, depending on the country and the specific band, it is likely the spectrum will be subject to licensing in only densely populated areas (urban or suburban environments). In rural areas, a licensing regime may not be attractive to offer a viable business case for potential WiMAX operators due to the cost of licensing spectrum and limited potential revenues from a sparse population of users. In some countries, the spectrum available for broadband wireless may be limited and insufficient to grant licenses to the many potential operators aspiring to offer service. Countries eager to enable operators to provide wireless communication service to their population are in the process of making spectrum available for use on an unlicensed basis. Thus, situations in which multiple operators would compete to provide service using the same unlicensed spectrum are both foreseeable and actually being encouraged.

Therefore, it would be desirable to have a method and apparatus that enables multiple communication networks to share in a dynamic manner unlicensed wireless resources.

Specific embodiments of the present invention are disclosed below with reference to FIGS. 1-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams above are described and shown with reference to specific signaling exchanged in a specific order, some of the signaling may be omitted or some of the signaling may be combined, sub-divided, or reordered without departing from the scope of the claims. Thus, unless specifically indicated, the order and grouping of the signaling depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to enable multiple, independent communication networks to share in an autonomous and dynamic manner unlicensed wireless resources. Generally, this involves determining that a first network node is using at least a portion of a wireless resource to provide network service to at least one remote unit. A second network node, under the control of a different network operator than the first node and desiring to use the wireless resource, sends the first network node, a request to relinquish use of at least a portion of the wireless resource. The second network node sends this request wirelessly, perhaps using the wireless resource itself. If the first network node grants the request, the second node may then begin using at least a portion of the relinquished resource to provide network service.

Figure 1:
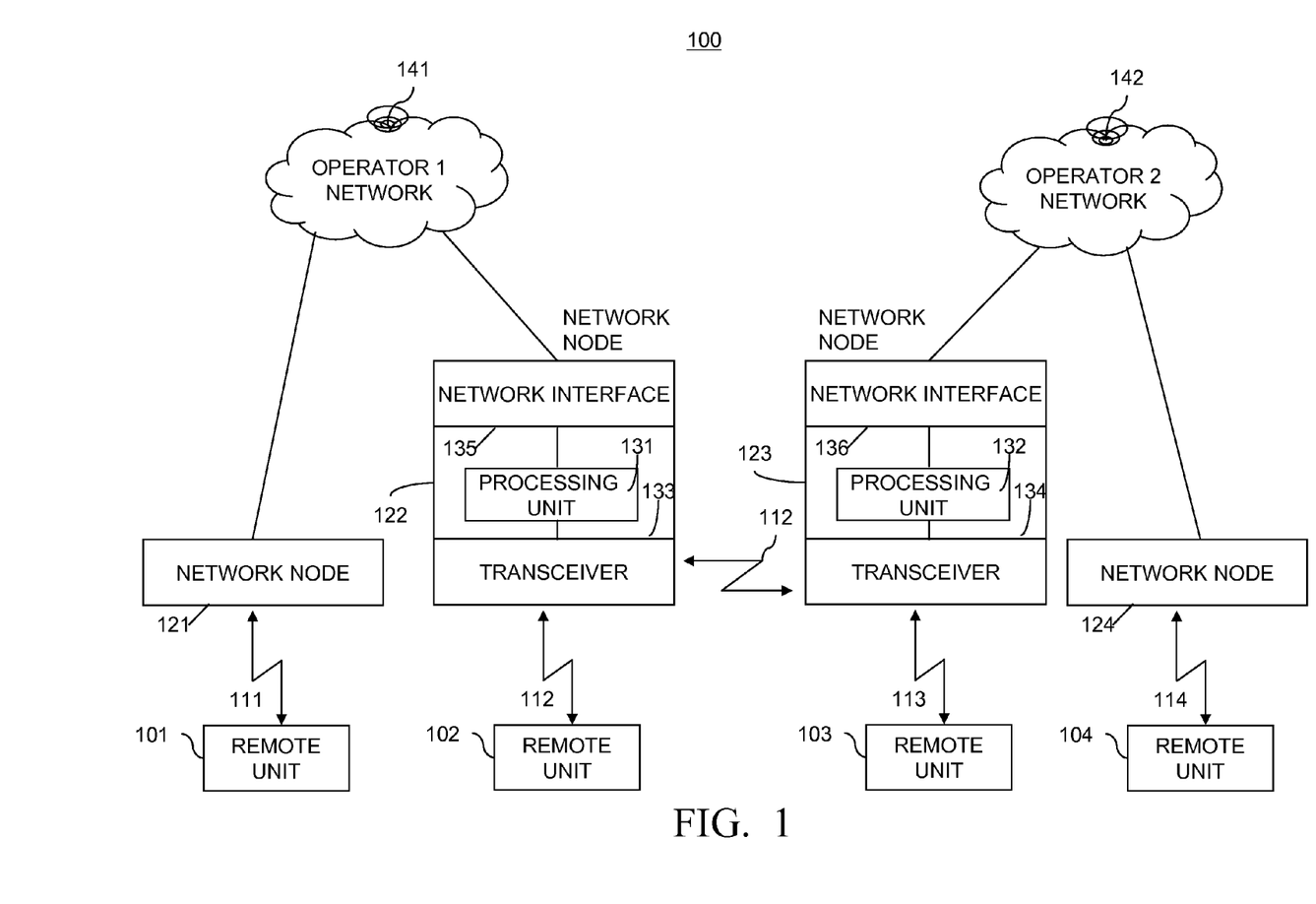
FIG. 1 is a block diagram depiction of a wireless communication system in accordance with multiple embodiments of the present invention.

The disclosed embodiments can be more fully understood with reference to FIGS. 1-6. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers)802, and WiMAX Forum are developing standards specifications for wireless telecommunications systems. (These groups may be contacted via http://www.openmobilealliance.com, http://www.3gpp.org/, http://www.3gpp2.com/, http://www.ieee802.org/, and http://www.wimaxforum.org/ respectively.) Communication system 100 represents a system having an architecture in accordance with one or more of the WiMAX Forum and/or IEEE 802 technologies, suitably modified to implement the present invention. Alternative embodiments of the present invention may be implemented in communication systems that employ other or additional technologies such as, but not limited to, those described in the OMA, 3GPP, and/or 3GPP2 specifications.

Communication system 100 is depicted in a very generalized manner. For example, system 100 is shown to simply include two different networks, one being operator 1's network (depicted by network components 121, 122 and 141) and the other being operator 2's network (depicted by network components 123, 124 and 142). Network nodes 121-124 are shown providing network service to remote units 101-104 using wireless interfaces 111-114, respectively. Wireless interfaces 111-114 are in accordance with the particular access technology supported by each respective network node. For example, they may all utilize the same technology such as one based on IEEE 802.16, or they may utilize different access technologies. Those skilled in the art will recognize that FIG. 1 does not depict all of the physical fixed network components that may be necessary for system 100 to operate but only those system components and logical entities particularly relevant to the description of embodiments herein.

For example, FIG. 1 depicts network nodes 122 and 123 as respectively comprising processing units 131 and 132, transceivers 133 and 134, and network interfaces 135 and 136. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, devices 122 and 123 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, a network node may be implemented in or across one or more RAN components, such as a base transceiver station (BTS) and/or a base station controller (BSC), a Node-B and/or a radio network controller (RNC), or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station.

Remote units 101-104 and network nodes 121-124 are shown communicating via technology-dependent, wireless interfaces. Remote units, subscriber stations (SSs) or user equipment (UEs), may be thought of as mobile stations (MSs), mobile subscriber stations (MSSs) or mobile nodes (MNs). In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote units 101-104 each comprise a processing unit (not shown) and transceiver (not shown). Depending on the embodiment, any of remote units 101-104 may additionally comprise a keypad (not shown), a speaker (not shown), a microphone (not shown), and a display (not shown). Processing units, transceivers, keypads, speakers, microphones, and displays as used in remote units are all well-known in the art.

Operation of embodiments in accordance with the present invention occurs substantially as follows, first with reference to FIG. 1. Network node 122 uses wireless interface 112 to provide network service to remote unit 102. Processing unit 131 provides this network service via transceiver 133 and at least a portion of a wireless resource utilized by wireless interface 112. Network node 123, which is included in a different operator's network than network node 122, seeks to also provide network service in a wireless coverage area overlapping that of network node 122. For example, it may be a new network node being deployed to provide service to operator 2's customers.

Processing unit 132 via transceiver 134 determines that network node 122 is using at least a portion of the wireless resource utilized by wireless interface 112 to provide network service to remote units, such as remote unit 102. Processing unit 132, via transceiver 134 and wireless interface 112, may send a request for network node 122 to relinquish use of at least a portion of the wireless resource network node 122 is using to provide network service. Processing unit 131 receives this request via transceiver 133 and may or may not stop using at least a portion of the wireless resource. If network node 122 relinquishes at least a portion of the wireless resource, then processing unit 132 via transceiver 134 may begin using at least a portion of the relinquished resource. Thus, operator 2 may then be able to provide network service via network node 123 and wireless interface 113 (utilizing at least a portion of the relinquished wireless resource) to remote units such as remote unit 103.

The process of determining whether or not to grant the request varies from one embodiment to the next. Different embodiments may strive to achieve different degrees of fairness among operators who are contending for the same wireless resources, and/or different embodiments may use different rules or techniques to achieve a particular degree of fairness. Whether the request is granted may also depend on the particular number of operators contending, the relative number of resources each operator's network is presently using, the current loading condition (e.g., an overloaded condition verses a lightly loaded condition) of particular network nodes, the history of resource usage and/or sharing history between operators, a degree of randomness, etc.

Figure 2:
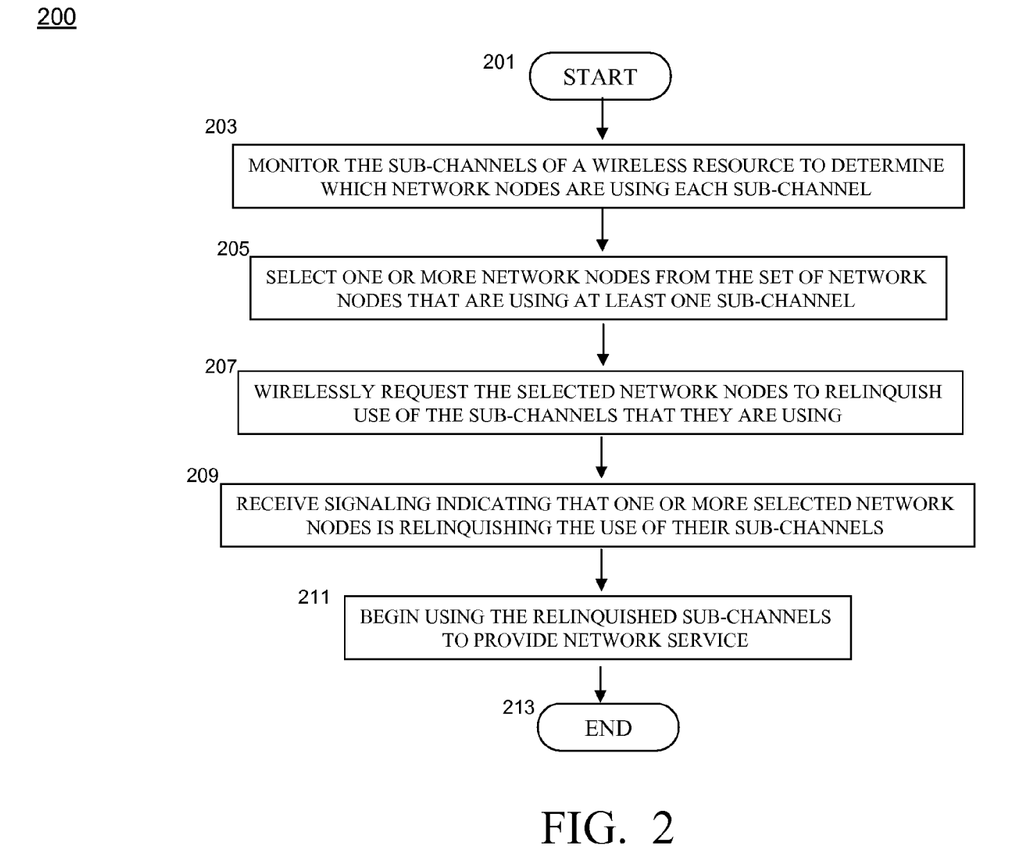
FIG. 2 is a logic flow diagram of functionality performed by a network node in accordance with certain embodiments of the present invention.
Figure 3:
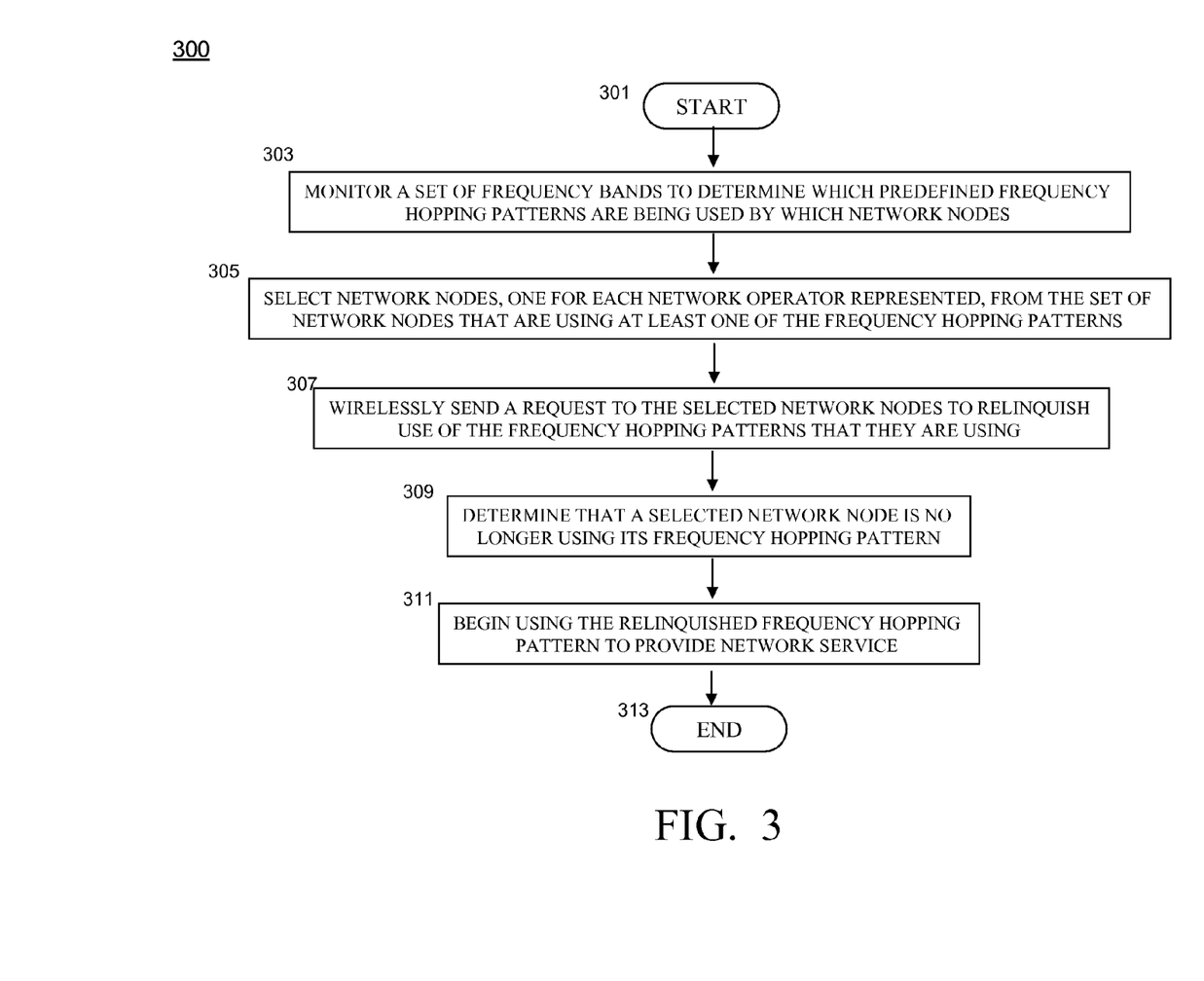
FIG. 3 is a logic flow diagram of functionality performed by a network node in accordance with certain other embodiments of the present invention.
Figure 4:
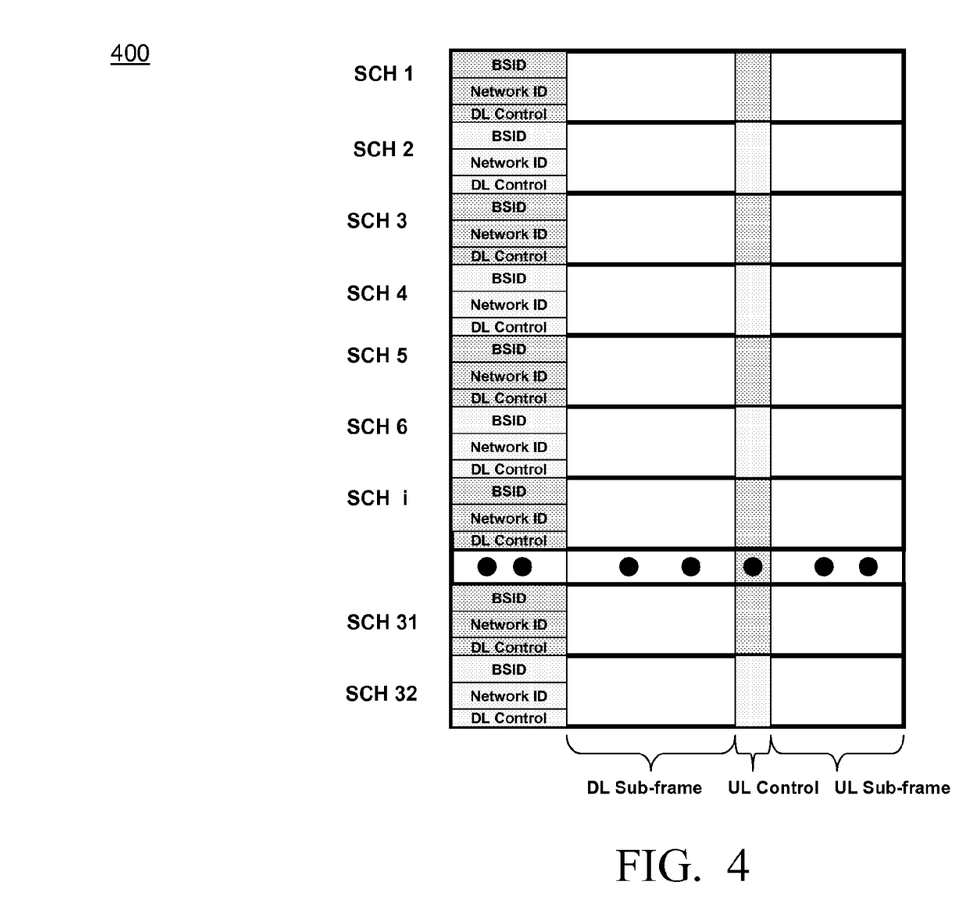
FIG. 4 is a block diagram depiction of a frame structure across all the sub-channels in a frequency band in accordance with multiple embodiments of the present invention.

For example, FIGS. 2 and 3 are logic flow diagrams of functionality performed by network nodes in accordance with two different groups of embodiments of the present invention. Logic flow 200 depicts functionality performed in certain embodiments in which the wireless resource in question comprises a frequency band with numerous sub-channels. In contrast, logic flow 300 depicts functionality performed in certain other embodiments in which the wireless resource in question comprises one frequency band of a set of frequency bands at any given time, which frequency band of the set being determined as a function of time according to a predefined frequency hopping pattern. Thus, in these logic flow 300 embodiments, the wireless resource may be thought of as a frequency hopping pattern that may be used by exactly one network node at any time instant.

Logic flow 200 begins (201) with a network node monitoring (203) each sub-channel of a wireless resource to determine what network node may be using each sub-channel. The network node selects (205) one or more network nodes from the set of network nodes that were determined to be using at least one sub-channel of the wireless resource. This selection may be based on the total number of sub-channels being used by the network nodes associated with a certain network operator (e.g., the network operator with the highest total number of sub-channels). The network node then wirelessly requests (207) the selected nodes to relinquish use of the sub-channels that they are using. For example, this request may be sent wirelessly via the sub-channels used by the selected nodes. When the network node receives (209) signaling indicating that one or more selected network nodes is relinquishing the use of their sub-channels, the network node may then begin (211) to use the relinquished sub-channels to provide network service. Logic flow 200 thus ends (213).

Logic flow 300 begins (301) with a network node monitoring (303) a set of frequency bands to determine which predefined frequency hopping patterns are being used by which other nodes. The network node selects (305) nodes from the set of network nodes that are using at least one of the frequency hopping patterns. For example, for each network operator represented in the set of network nodes, one node may be selected. The network node then wirelessly requests (307) the selected nodes to relinquish use of the frequency hopping patterns that they are using. For example, this request may be sent wirelessly via an uplink portion of the wireless resource used by each of the selected nodes. The network node then waits for a response to its requests. In some embodiments, it may get an implicit response when the network node determines (309) that a selected network node is no longer using its frequency hopping pattern. In this case, the network node may then begin (311) to use the relinquished frequency hopping pattern to provide network service. Logic flow 300 thus ends (313). In other embodiments, the network node may receive explicit signaling indicating that the requested resource (frequency hop pattern) has been relinquished.

While FIGS. 2 and 3 more generally depict two different groups of embodiments of the present invention, it is believed that a more detailed description of particular embodiments of the present invention will assist the reader in understanding and implementing the more generically described embodiments above. The embodiments described below are provided as examples. They are provided as particular, and quite specific, example embodiments of the present invention. They are intended to further the reader's understanding of the variety of possible embodiments rather than to limit the scope of the invention.

Suppose we are given N MHz of unlicensed spectrum between X and (X+N) MHz. (e.g., N=40 MHz and X=3600 MHz). Unlicensed means no operator can claim ownership of the entire band or sub-bands on a permanent basis. Instead, anyone who deploys a system is expected to behave according to some loosely defined criteria or etiquette of operation. For the purpose of description, consider the available spectrum is divided into sub-channels. In the example below, we assume that the 40 MHz channel is divided into NO_OF_CHANNELS (=32) sub-channels of 1.25 MHz each.

With unlicensed mode of operation, each of the sub-channels is initially not assigned to any operator. Subsequently, as an operator wants to start offering service in a given region, the initial task is to assess what sub-channels are available for occupation and may be used for offering communication service. Being an unlicensed system, an operator is not allowed to monopolize the use of available spectrum nor permanently "own" any portion of the spectrum. Instead, the embodiment described in the steps below provides for sharing within the spectral band in a manner that allows the total spectrum band to be used and shared fairly.

1) If there is no incumbent operator and exactly one new operator arrives in a given geographic region, that $1^{st}$ operator will be able to grab the entire band (all sub-channels). The operator may not have a need for fully utilizing all of the sub-channels. However, by virtue of being first on the scene, the operator becomes the temporary "owner" and has access to and potential use for all of them, until another operator arrives on the scene.
2) When a new BS/AP ($BS_{NEW}$), belonging to a $2^{nd}$ operator is introduced, the following steps are executed.
3) $BS_{NEW}$ will first monitor the radio environment as follows. It determines if there is any other Base Station in its neighborhood (sense the environment in order to follow an etiquette). If none is detected, it acts as a new base station of the $1^{st}$ operator (as in step 1). Otherwise, it proceeds to step 4.
4) Determine for each sub-channel, the current status of use by monitoring a Broadcast Control Header (BCH) that includes information about the identity of the incumbent user of the sub-channel. At a minimum the following are contained in the BCH:
a) Base Station ID and
b) Network ID (or Operator ID)
Each Base Station belongs to a specific provider who is identified with an associated unique Operator ID. See, for example, FIG. 4 which is a block diagram depiction of a sample frame structure 400.
5) $BS_{NEW}$ determines which of its neighboring BS/AP it should contact for acquiring sub-channels (i.e., bandwidth). The following steps are executed.
For each distinct operator in the neighborhood, calculate the number of sub-channels that are currently in use by the operator. This is simply the sum of the number of sub-channels occupied by neighboring BS/AP's that belong to the operator.
Let the set of neighboring BS/APs that belong to the operator occupying the largest number of sub-channels be denoted as LENDING_NEIGHBORS_OF ($BS_{NEW}$). This is the set of BS/APs that will be requested to give up a portion of their occupied bandwidth
6) $BS_{NEW}$ sends an explicit BANDWIDTH_BORROW_REQUEST signaling message to each BS/AP in the set LENDING_NEIGHBORS_OF ($BS_{NEW}$). The signal will indicate that $BS_{NEW}$ is being introduced anew.
7) Each incumbent BS/AP that is contacted by $BS_{NEW}$ is expected to relinquish up to half of the overall bandwidth or sub-channels it is currently occupying. This mechanism steers toward implementation of a fair sharing arrangement.
8) In response to the request received in step 7, each incumbent BS/AP sends a confirmation (i.e., granting the request by relinquishing up to half the sub-channels). Note the request may only be partially fulfilled because the operator may be currently operating at or above his fair share but will fall below his fair share if all the requested bandwidth is relinquished. If the number of operators in a region is NO_OF_OPERATORS, then:
The fair share of spectrum for any operator at the geographic region is floor(NO_OF_CHANNELS/NO_OF_OPERATORS)
Since each BS/AP is monitoring the radio neighborhood on a continuing basis, it has knowledge of how many sub-channels are currently assigned to the operator that owns it. From that information, each BS/AP is capable of computing the total number of sub-channels the operator is occupying at a given instant.
If the BANDWIDTH_BORROW_REQUEST is only partially satisfied, then $BS_{NEW}$ will contact additional neighbor BS/APs. These will belong to different neighbor operators and the process of request and grant will continue until $BS_{NEW}$ achieves the fair share for the new operator, or all the neighbor operators have been requested.
9) If a $3^{rd}$ operator is subsequently introduced, the newly introduced BS/AP of the $3^{rd}$ operator goes through a process of discovery and learning about the radio neighborhood. The BS/AP will then send an explicit BANDWIDTH_BORROW_REQUEST to each BS/AP that is in the LENDING_NEIGHBORS_OF ($BS_{NEW}$).

The following additional steps are executed by each BS/AP to adaptively adjust operation of the unlicensed operator in response to changing load conditions.

10) Each BS/AP transmits to each of its neighbor BS/APs the load condition of each sub-channel it is currently occupying. This may be implemented by having a Dedicated Subscriber Station (DSS) associated with a BS/AP solely for control purposes.

If a particular BS/AP becomes overloaded (OVER_LOADED_BS), then it could request additional sub-channels from a neighbor BS/AP that belongs to another operator.

If little or no activity is detected in a neighbor LIGHTLY_LOADED_BS, as determined by a contiguous (and etiquette-defined) number of idle or lightly loaded frames, then the OVER_LOADED_BS could request to "borrow" sub-channels from the LIGHTLY_LOADED_BS.

LIGHTLY_LOADED_BS (the "owner" of the sub-channels) would be obliged to relinquish it based on idle frames meeting the etiquette rule. The requesting BS/AP would obtain the sub-channels and could use it for increased capacity.

An example of spectrum sharing is provided below to illustrate the techniques described above:

Initially, there are no operators. The whole spectrum is available and divided into 32 sub-channels as shown below. Operator 1 arrives on the scene and claims all 32 sub-channels. Operator 2 then arrives on the scene, senses the presence of Operator 1 and claims half the sub-channels from Operator 1.

Operator 3 then arrives on the scene. It senses the presence of Operator 1 and Operator 2. Operator 3 will determine that the fair share of bandwidth it is entitled to is: 32/3~10 sub-channels. It will start requesting its neighbors, Operators 1 and 2, to relinquish bandwidth. The neighbors initially have occupied 16 sub-channels until arrival of Operator 3. They will oblige to the request from Operator 3 by giving up their bandwidth until they reach their fair share. For example, Operator 1 may give up 6 sub-channels and Operator 2 may give up 4 sub-channels. The end result is the following split: Operators 1, 2 and 3 will have 10, 12 and 10 sub-channels, respectively.

Operator 4 then arrives on the scene. It senses the presence of Operator 1 and Operator 2. However, Operator 4 is physically located such that it is not in the radio vicinity of Operator 3. Thus, Operator 4 will determine the fair share of bandwidth it is entitled to is: 32/3~10 sub-channels. Before it starts requesting its neighbors to relinquish bandwidth, it will first detect what sub-channels are not being used by its neighbor operators. In this case, it will detect 10 sub-channels are not occupied by Operators 1 and 2. Therefore, Operator 4 will use these 10 sub-channels and has no need to request bandwidth from any of its neighbors.

Additional Comments:

Note that the mechanism described above enables bandwidth to be made available where it could be utilized to serve users (congestion relief by temporary transfer of bandwidth from lightly load to heavily loaded BS/AP).

An additional mechanism may be built-in to ensure that there is no ping-pong effect of frequent back and forth transfer of bandwidth between two neighbor BS/APs. This may be accomplished by building a minimum time interval that must elapse before a donor BS/AP can ask for bandwidth from a borrower BS/AP to whom bandwidth was previously donated.

Transfer of bandwidth from a lightly loaded BS (based on recent traffic condition) is for a temporary duration and may lead an operator to function with less than his fair share of bandwidth. If the traffic in the donor operator increases, then the bandwidth that was lent by a lightly loaded BS will be reclaimed from the borrower BS by asking it to relinquish what was borrowed from the lightly loaded BS. Thus, robust mechanisms may be built in to provide self-regulation and self-adjustment with respect to the traffic and load conditions.

Another Detailed Embodiment will now be Described:

Suppose we are given N MHz of unlicensed spectrum between X and (X+N) MHz. (e.g. N=50 MHz and X=3650 MHz). The description below applies for different choices of X and N. Unlicensed means no operator can claim ownership of the band or sub-bands on a permanent basis. Instead, anyone who deploys a system is expected to behave according to some loosely defined criteria or etiquette of operation.

Figure 5:
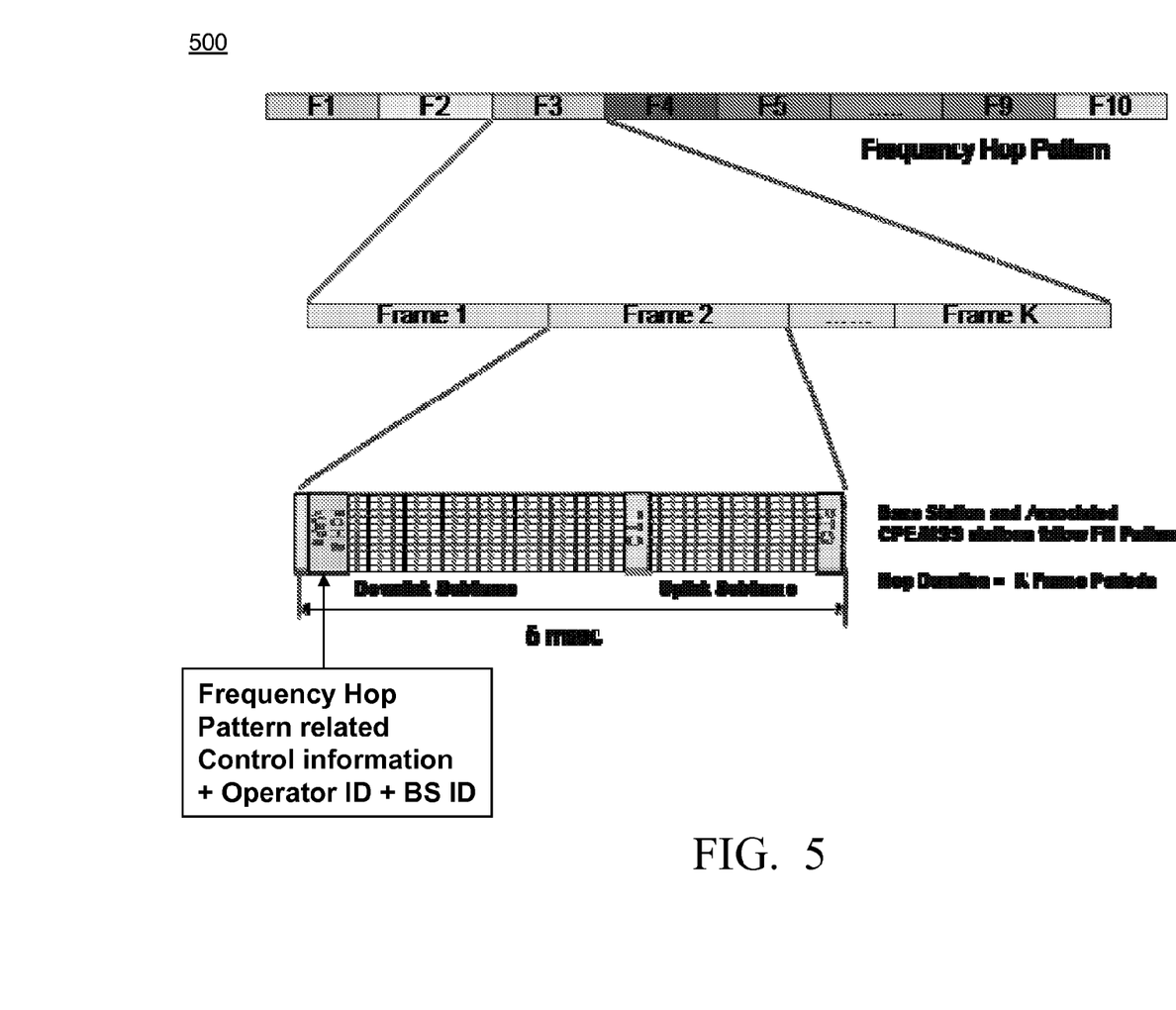
FIG. 5 is a block diagram depiction of a frame structure within a frequency hopping system in accordance with multiple embodiments of the present invention.
Figure 6:
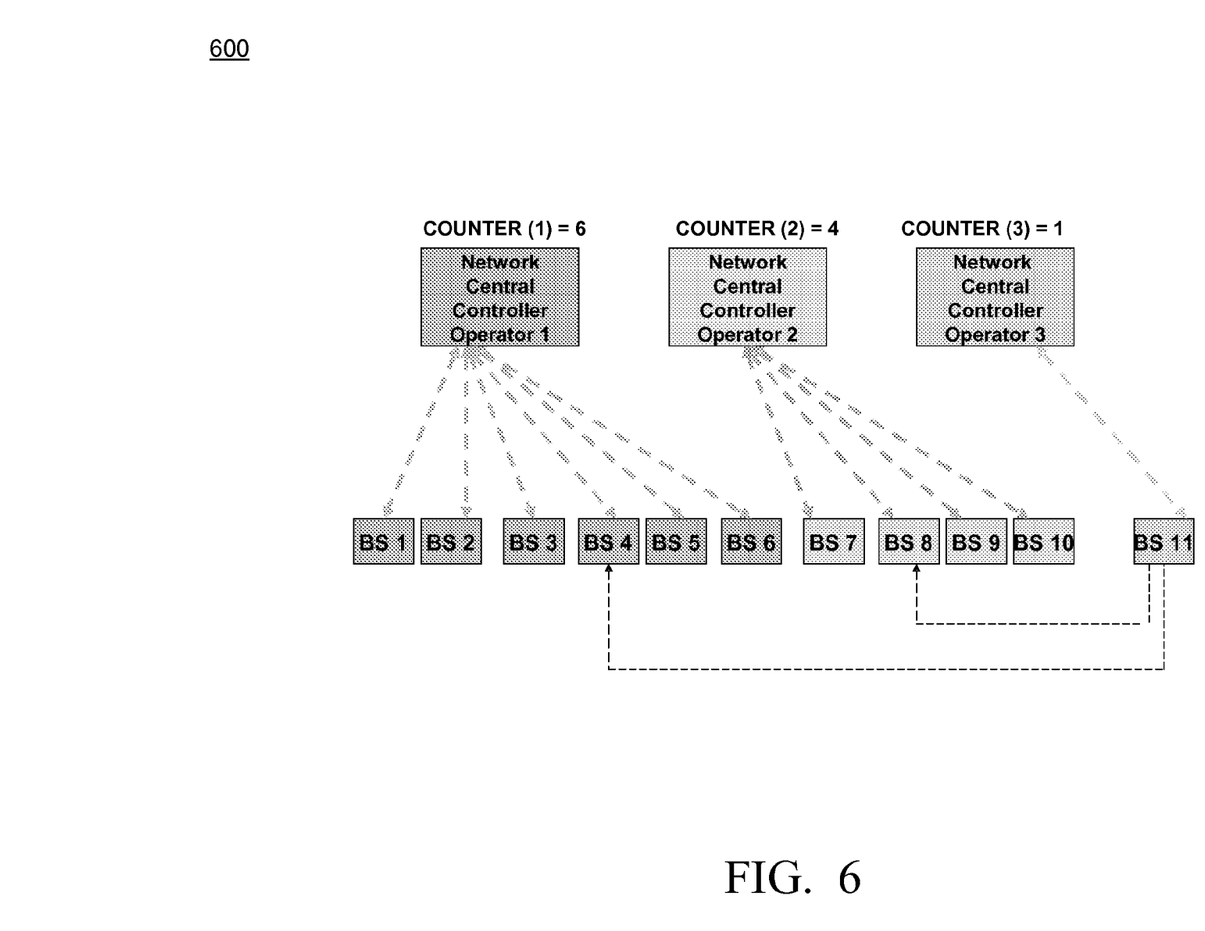
FIG. 6 is a block diagram depiction of multiple networks based on a frequency hopping system in accordance with multiple embodiments of the present invention.

Next we outline a high level design for operation in unlicensed bands. Suppose we divide the available spectrum of 50 MHz into 10 sub-bands each 5 MHz width. Let the frequencies be denoted as: $f_1, f_2, f_3, f_4, f_5, f_6, f_7, f_8, f_9, f_{10}$. We will assume a slow frequency hopping (FH) mode of operation as follows. FIG. 5 is a block diagram depiction of a frame structure within a frequency hopping system 500. Each Base Station will hop in frequency according to a FH pattern. The FH patterns will be pre-determined and known to all in the industry. Base Station 1 and associated subscribers will follow the FH pattern:

$$f_1 \to f_2 \to f_3 \to f_4 \to f_5 \to f_6 \to f_7 \to f_8 \to f_9 \to f_{10}$$

Each Base Station belongs to a specific provider or operators with a unique operator identifier. Associated with each operator's network is a functional entity called Network Central Controller (NCC) that keeps track of number of Base Stations that belongs to the operator. See for example, FIG. 6 which is a block diagram depiction of a frequency hopping system 600 (a multiplicity of network operators with network nodes using frequency hopping patterns as wireless resources). Let COUNTER(X) represent the number of Base Stations belonging to operator with identifier X.

When a second Base Station 2 is installed and turned on, it first monitors the environment and determines if there is any other Base Station in its neighborhood (sense the environment in order to follow a etiquette). If no BS is detected, it chooses one of the FH patterns at random, and starts hopping and operating—ready to associate remote units and grant bandwidth request etc. If one or more BS stations are detected in the neighborhood, the new Base Station will monitor what FH patterns are being used. Then after sufficient monitoring, the new Base Station will pick an unused FH pattern (from the list of published FH patterns) and then start hopping according to the chosen pattern. Up to 10 Base Stations that are in proximity of each other can operate in frequency hopping mode without interfering with each other as long as they hop in sync with each other (use the same amount of time for their hopping duration at any given frequency). 10 BSs is believed to be a sufficiently large number for deployment in a rural area and that can operate without causing interference with each other.

Operation of the present detailed embodiment is described in the following steps:

1. When a new Base Station (nBS) is turned ON, it monitors the radio environment and the frequency hopping patterns in use.
2. If an unused FH pattern is detected as available, then the BS grabs the FH pattern and starts using it. It also notifies its associated Network Central Controller. (Note: There is one NCC for each operator).
3. When NCC receives the notification sent in step 2, it increments COUNTER(NCC) by (100+r.v.) where r.v. is chosen uniformly randomly in the range <−10, +10>.
4. When an unused FH pattern is not available, the new Base Station takes the following actions.
5. For each existing network that is in the radio vicinity of nBS, exactly one cBS (current Base Station) is selected.
6. A request to release the FH pattern used by the cBS is sent in the Uplink random access portion of the channel. (nBS→cBS)
7. cBS forwards the request to its NCC. (cBS→NCC)
8. On receipt of the request, the NCC will set a timer to count down from (1000-COUNTER(NCC))
9. Multiple NCCs may initiate the countdown process with their respective counters.
10. The first NCC that reaches zero sends a signal called RELEASE_FHP to the corresponding cBS. (NCC→cBS)
11. The cBS releases the frequency hopping pattern by stopping the hopping process.
12. The nBS is continuously monitoring the Frequency hopping patterns it had requested to determine if they have become available and grabs the first FH pattern that is freed up.
13. Subsequently the nBS will send a CANCEL_FHP_REQUEST to all other cBSs to which it originally sent the request.
14. The nBS also notifies its own NCC about use of the pattern so that it can update its COUNTER.

Note other variations of some steps outlined above are possible to realize this embodiment in practice. For instance, after step 11, when a frequency hopping channel is relinquished by a base station, it is possible that more than one nBS is waiting to grab a channel (perhaps an unlikely but a theoretically possible event). Thus, the implementation should bias the selection process of who gets the new channel first.

Suppose there are two operators X and Y that are both interested in adding a base station to their networks. Let operator X and Y have N(X) and N(Y) base stations currently in operation. When a frequency hopping channel becomes available, each Base Station will wait an additional number of frequency hop durations before grabbing the frequency hop channel, assuming it is still free. The number of additional hops that a new base station of operator X may wait =(10*N(X)+r.v.) where r.v. is a random variable chosen uniformly randomly between <−4, +4>. This scheme will bias the selection process in favor of operator with fewer base station to grab the frequency hop channel first. The new Base Station of the operator that failed to get a frequency hopping channel will revert back to the original process of hunting for a free channel as outlined above.

One of skill in the art will appreciate that various modifications and changes may be made to the specific embodiments described above with respect to FIGS. 1-6 without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the information or object being indicated. Some, but not all examples of techniques available for communicating or referencing the information or object being indicated include the conveyance of the information or object being indicated, the conveyance of an identifier of the information or object being indicated, the conveyance of information used to generate the information or object being indicated, the conveyance of some part or portion of the information or object being indicated, the conveyance of some derivation of the information or object being indicated, and the conveyance of some symbol representing the information or object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for a plurality of communication networks that include a plurality of network nodes which provide wireless services to at least one remote unit via an air interface, to dynamically share wireless resources comprising:
determining that a first network node of the plurality of network nodes is using at least a portion of a wireless resource to provide network service to at least one remote unit;
wirelessly sending, by a second network node of the plurality of network nodes to the first network node, a request for the first network node to relinquish use of at least a portion of the wireless resource, wherein the second network node uses at least a portion of the relinquished wireless resource to provide network service to at least one remote unit, wherein the second network node is under control of a different network operator than the first network node and wherein wirelessly sending the request for the first network node to relinquish use comprises sending, via an uplink portion of the wireless resource, the request for the first network node to relinquish use of at least a portion of the wireless resource in response to detecting that an overloaded condition is present at the second network node.

2. The method of claim 1, wherein determining that the first network node is using at least a portion of the wireless resource comprises
monitoring each sub-channel of the wireless resource to determine what network node may be using each sub-channel, wherein the wireless resource comprises a frequency band.

3. The method of claim 2, wherein monitoring each sub-channel of the wireless resource comprises
monitoring a control header of each sub-channel of the wireless resource, wherein the control header of each sub-channel being used in the wireless resource comprises at least one of:
a network node identifier,
a network identifier, and
a network operator identifier.

4. The method of claim 1, further comprising
selecting the first network node from a plurality of network nodes based on a total number of sub-channels of the wireless resource being used by network nodes associated with a first network operator,
wherein the first network node is associated with the first network operator and
wherein each of the plurality of network nodes are determined to be using at least one sub-channel of the wireless resource to provide network service.

5. The method of claim 1, further comprising
receiving, by the second network node from the first network node, signaling indicating that the first network node relinquishes use of at least a portion of the wireless resource.

6. The method of claim 1, further comprising
sending, by the second network node to the first network node, an indication of a loading condition being experienced by the second network node.

7. The method of claim 1, wherein the wireless resource comprises one frequency band of a set of frequency bands at any given time, which frequency band of the set being determined as a function of time according to a predefined frequency hopping pattern.

8. The method of claim 7, wherein determining that the first network node is using at least a portion of the wireless resource comprises
monitoring the set of frequency bands to determine which predefined frequency hopping patterns of a plurality of predefined frequency hopping patterns is being used by network nodes to provide network service.

9. The method of claim 8, further comprising
selecting the first network node from a plurality of network nodes based on which network operator the first network node is associated with,
wherein each of the plurality of network nodes are determined to be using a predefined frequency hopping pattern of the plurality of predefined frequency hopping patterns.

10. The method of claim 7, wherein wirelessly sending the request for the first network node to relinquish use comprises
sending, via an uplink random access portion of the wireless resource, a request for the first network node to relinquish use of the wireless resource.

11. The method of claim 7, further comprising
determining, by the second network node, that the first network node is no longer using the wireless resource;
using, by the second network node, the wireless resource determined to be relinquished by the first network node to provide network service to at least one remote unit.

12. A method for a plurality of communication networks that include a plurality of network nodes which provide wireless services to at least one remote unit via an air interface, to dynamically share wireless resources comprising:
using, by a first network node of the plurality of network nodes, at least a portion of a wireless resource to provide network service to at least one remote unit;
wirelessly receiving, by the first network node from a second network node of the plurality of network nodes, a request for the first network node to relinquish use of at least a portion of the wireless resource, wherein the request is received at the first network node based on detecting an overload condition at the second network node, wherein the second network node uses at least a portion of the relinquished wireless resource to provide network service to at least one remote unit, and wherein the second network node is under control of a different network operator than the first network node;
in response to receiving the request, setting a timer;
in response to expiration of the timer, relinquishing use of at least a portion of the wireless resource.

13. The method of claim 12, further comprising
sending, by the first network node to the second network node, signaling indicating that the first network node relinquishes use of at least a portion of the wireless resource.

14. The method of claim 12, further comprising
sending, by the first network node to the second network node, signaling indicating that the first network node denies the request to relinquish use of at least a portion of the wireless resource.

15. The method of claim 12, further comprising
sending, by the first network node to the second network node, an indication of a loading condition being experienced by the first network node.

16. The method of claim 12, wherein the wireless resource comprises one frequency band of a set of frequency bands at any given time, which frequency band of the set being determined as a function of time according to a predefined frequency hopping pattern.

17. The method of claim 16, further comprising:
indicating, by the first network node to a network controller, that the request for the first network node to relinquish use of the wireless resource was received;
receiving, by the first network node from the network controller, an instruction to release the wireless resource;
ceasing, by the first network node in response to the instruction, to use the wireless resource.

18. A network node that provides wireless services to at least one remote unit via an air interface comprising:
a transceiver;
a processing unit, communicatively coupled to the transceiver, configured to determine, via the transceiver, that another network node is using at least a portion of a wireless resource to provide network service to at least one remote unit and configured to wirelessly send, to the other network node via the transceiver, a request for the other network node to relinquish use of at least a portion of the wireless resource, wherein the network node uses at a least portion of the relinquished wireless resource to provide network service to at least one remote unit, wherein the other network node is under control of a different network operator than the network node and wherein wirelessly sending the request for the network node to relinquish use comprises sending, via an uplink portion of the wireless resource, the request for the network node to relinquish use of at least a portion of the wireless resource in response to detecting that an overloaded condition is present at the other network node.

19. An apparatus for providing wireless services to at least one remote unit via an air interface comprising:

a transceiver;

a processing unit, communicatively coupled to the transceiver, configured to use, via the transceiver, at least a portion of a wireless resource to provide network service to at least one remote unit and configured to wirelessly receive, from a network node via the transceiver, a request for the apparatus to relinquish use of at least a portion of the wireless resource, wherein the request for the apparatus is received based on detecting an overload condition at the network node, wherein the network node uses at least a portion of the relinquished wireless resource to provide network service to at least one remote unit, and wherein the network node is under control of a different network operator than the apparatus;

a controller that is configured to, in response to receipt of the request, set a timer;

wherein the processing unit is configured to, in response to expiration of the timer, relinquish use of at least a portion of the wireless resource.

20. The apparatus of claim 19, wherein the transceiver is configured to send, to the network node, signaling indicating that the relinquishment of use of at least a portion of the wireless resource.

* * * * *